(12) United States Patent
Fryers et al.

(10) Patent No.: US 11,160,263 B2
(45) Date of Patent: Nov. 2, 2021

(54) DETECTING THE PRESENCE OF PESTS USING NETWORKED SYSTEMS

(71) Applicant: Spotta Limited, Cambridge (GB)

(72) Inventors: Robert John Clayton Fryers, Bedford (GB); Neil D'Souza-Mathew, Great Shelford (GB); Gareth David Funk, Cambridge (GB)

(73) Assignee: Spotta Limited, Cambridge (GB)

( * ) Notice: Subject to any disclaimer, the term of this patent is extended or adjusted under 35 U.S.C. 154(b) by 0 days.

(21) Appl. No.: 16/961,228

(22) PCT Filed: Jan. 11, 2019

(86) PCT No.: PCT/GB2019/050075
§ 371 (c)(1),
(2) Date: Jul. 9, 2020

(87) PCT Pub. No.: WO2019/138242
PCT Pub. Date: Jul. 18, 2019

(65) Prior Publication Data
US 2021/0029984 A1    Feb. 4, 2021

(30) Foreign Application Priority Data
Jan. 12, 2018  (GB) ..................................... 1800518

(51) Int. Cl.
*A01M 1/02*      (2006.01)
*A01M 1/04*      (2006.01)
(Continued)

(52) U.S. Cl.
CPC ............ *A01M 1/026* (2013.01); *A01M 1/023* (2013.01); *A01M 1/04* (2013.01); *G06K 9/00362* (2013.01);
(Continued)

(58) Field of Classification Search
None
See application file for complete search history.

(56) References Cited

U.S. PATENT DOCUMENTS

2014/0279600 A1   9/2014  Chait
2016/0026895 A1   1/2016  Huffman et al.
(Continued)

FOREIGN PATENT DOCUMENTS

WO    2004110142    12/2004
WO    2017168412    10/2017
(Continued)

OTHER PUBLICATIONS

UKIPO, Search Report in GB 1800518.1, 1 pg.
(Continued)

*Primary Examiner* — James M Anderson, II
(74) *Attorney, Agent, or Firm* — Henry Patent Law Firm PLLC (57) ABSTRACT

A system for detecting the presence of pests, the system comprising: at least one remote camera system, each of the at least one remote camera system comprising an image capture device coupled to a processor and a wireless transmitter, each of the at least one remote camera system having a pest detection surface and being configured to: capture one or more image of the pest detection surface; process the captured one or more image to recognise the potential presence of a target pest on the pest detection surface; and transmit data from the captured one or more image in response to recognising the potential presence of one or more target pests; and a server configured to: receive the transmitted data; process the transmitted data to verify the potential presence of the target pest on the pest detection surface; and provide an output indicating the verification.

16 Claims, 5 Drawing Sheets

(51) Int. Cl.
  *G06K 9/00* (2006.01)
  *G08B 13/196* (2006.01)
  *H04N 7/18* (2006.01)
  *H04N 5/225* (2006.01)

(52) U.S. Cl.
  CPC ..... *G06K 9/00624* (2013.01); *G08B 13/1966* (2013.01); *H04N 7/181* (2013.01); *H04N 7/188* (2013.01); *H04N 5/2252* (2013.01); *H04N 5/2253* (2013.01)

(56) References Cited

U.S. PATENT DOCUMENTS

| | | | |
|---|---|---|---|
| 2016/0245916 A1* | 8/2016 | Weber-Grabau | G01B 11/08 |
| 2017/0231213 A1 | 8/2017 | Gordon et al. | |
| 2017/0273290 A1 | 9/2017 | Jay | |
| 2017/0286772 A1* | 10/2017 | Workman | H04L 67/10 |
| 2018/0177178 A1 | 6/2018 | Bhakta et al. | |
| 2018/0231550 A1* | 8/2018 | Willenberg | A01M 1/106 |
| 2019/0000019 A1* | 1/2019 | Alexander | B25J 9/1679 |

FOREIGN PATENT DOCUMENTS

| | | |
|---|---|---|
| WO | 2018134550 | 7/2018 |
| WO | 2018140679 | 8/2018 |

OTHER PUBLICATIONS

UKIPO, Examination Report in GB1800518.1, 2 pgs.
WIPO, International Search Report and Written Opinion dated Mar. 21, 2019, in PCT/GB2019/050075, 3 pgs.

* cited by examiner

DETECTING THE PRESENCE OF PESTS USING NETWORKED SYSTEMS

CROSS-REFERENCE TO RELATED APPLICATIONS

This application is a national stage entry of PCT/GB2019/050075, filed Jan. 11, 2019 and entitled "System and Methods," which claims priority to United Kingdom Appl. No. GB 1800518.1, filed Jan. 12, 2018 and entitled "System and Methods." The disclosures of both applications are hereby incorporated herein by reference.

TECHNICAL FIELD

The present disclosure relates to a system, method and apparatus for networked detection systems for detecting the presence of pests.

BACKGROUND

Rodents, flies, bedbugs, cockroaches, and other nuisance insects and animals (hereafter referred to collectively as "pests") create health concerns and introduce spoilage, among other concerns, in a range of domestic and commercial environments (hereafter referred to as "assets"). These are often of grave concern for the owners, occupiers or other persons responsible for the environments in question (such people are hereafter referred to collectively as "asset owners").

Many asset owners deploy a variety of traps and/or monitors throughout the business' physical premises and facilities to insure the detection and/or elimination of such pests. These actions can be undertaken to ensure inspection compliance, to maintain sanitary conditions, reduce spoilage, comply with applicable laws and regulations, and/or increase consumer confidence. Even upon complete elimination of pests from a physical site, however, the pests can often find their way back into the premises. Therefore, even if the pests are reduced or eliminated, pest monitors or traps are continuously used in order to detect the presence of pest activity.

Since many assets are physically large, often a great many traps are required to adequately cover the premises. As the number of traps increases, so too does the time and labour required to physically inspect the traps. Presently, physical inspections of each and every trap at a facility are performed at desired time intervals (e.g., weekly or monthly). These inspections insure that captured pests are removed from the trap, that the trap is in working order and that the trap is still in the proper location. It will be appreciated, however, that while each trap is inspected, such inspection is not oftentimes needed for each trap. For example, in many cases a large number of traps do not catch any pests in the given time interval, the traps are still in working order and the traps are properly placed.

Background art can be found in U.S. Pat. Nos. 4,517,557; 4,884,064; 5,949,636) 7,212,129, 7,348,890, 6,445,301, 4,862,145, 7,656,300, 7,026,942, 8,156,683, 8,026,822, 8,830,071, 9,542,835, 8,599,026, 8,635,806, 7,317,399, 6,792,395, 6,775,946, 6,052,066, 9,015,987, 7,504,956, 6,707,384; US patent applications US20080204253, US20030160699; and Canadian patent application 2,897,534.

SUMMARY

The inventors have recognised problems with known systems which provide indications of trap activity on or near the trap (such as with an indicator light or audible alert) or use short-range communications to transmit a detection result to a nearby monitor device. Such solutions reduce the time required for inspections but do not eliminate them entirely because an operator must get close enough to observe the indicator or use the short-range device.

The inventors have also recognised problems with known pest control systems where the sensor detection result is transmitted automatically, without requiring an operator in proximate to the detector, and, in some examples where the result can be communicated over the internet. These systems make a determination on whether a pest is present or not and then transmit the result. This may be viable for simple sensors, such as switches or conductive elements, where the sensor outputs a simple analogue or binary level. However, for more sophisticated sensors, such as imaging sensors, the data processing power and cost of processing hardware necessary to perform the analysis on the remote device are significant drawbacks.

The inventors have also recognised problems with known systems in which raw sensor data is transmitted and processing is done on a central base station, computer, server or similar. These systems suffer from drawbacks in power consumption and data transmission costs because they transmit raw sensing data. Such a solution may be viable for simple sensors, such as switches, but is a significant drawback for more sophisticated sensors, such as imaging sensors, where a much greater quantity of data is produced and would need to be transmitted.

The inventors have also recognised that known pest detectors using imaging or vision sensors either do not offer remote monitoring or suffer from severe limitations in the frequency of data transmission.

According to one aspect of the present disclosure there is provided a system for detecting the presence of pests, the system comprising: at least one remote camera system, each of the at least one remote camera system comprising an image capture device coupled to a processor and a wireless transmitter, each of the at least one remote camera system having a pest detection surface and being configured to: capture one or more image of the pest detection surface; process the captured one or more image to recognise the potential presence of a target pest on the pest detection surface; and transmit data from the captured one or more image in response to recognising the potential presence of one or more target pests; and a server configured to: receive the transmitted data; process the transmitted data to verify the potential presence of the target pest on the pest detection surface; and provide an output indicating the verification.

The at least one remote camera system may be further configured to process the data from the one or more captured image to reduce a quantity of data to be transmitted by selecting a data segment from the one or more captured image restricted in one or both of time and space.

The image capture device may be configured to be mounted in a fixed spatial relationship with the pest detection surface.

The pest detection surface may comprise part of or is attached to a housing of the at least one remote camera system.

The pest detection surface may be no more than 30 cm from the image capture device. That is, the pest detection surface may be at a distance of less than or equal to 30 cm from the image capture device.

The at least one remote camera system may further comprise a trigger sensor to detect the target pest to trigger capture of an image.

The at least one remote camera system may further comprise a pest attractant.

The pest attractant may comprise a pheromone or a kairomone.

The pest attractant may comprise one or any combination of: a patterned surface, an ultraviolet reflector, a physical structure, a heat source, and food for the target pest.

The target pest may comprise one or any combination of: a fruit fly, bed bug, silverfish, cockroach, insect, and arthropod.

The at least one remote camera system may be configured to input external environment information and wherein one or both of the image capture and image processing by the at least one camera system are responsive to the external environment information.

The server may be configured to input external environment information and process both the transmitted data and the input external environment information to verify the potential presence of the target pest on the pest detection surface.

The external environment information may comprise one or more of a time of day, weather information, a time of year, temperature information, humidity information, insect population data, user input data specifying when an environment of the least one remote camera system was treated with a pest treatment.

One or both of the server and the at least one remote camera system may be configured to adapt the at least one remote camera system in response to the transmitted data.

The at least one remote camera system may be further configured to: process the one or more captured image using reference data to determine a first detection probability; compare the first detection probability to a first predetermined probability threshold; and recognise the potential presence of a target pest on the pest detection surface based on the first detection probability being greater than the first predetermined probability threshold.

The first predetermined probability threshold may be variable and each of the at least one remote camera system may be further configured to dynamically set the first predetermined probability threshold.

Each of the at least one remote camera system may be configured to dynamically set the first predetermined probability threshold based on one or more of: (i) a battery level of a battery of the remote camera system; (ii) a detection probability determined from processing one or more previously captured images (iii) a time of day; (iv) sensor data received from a trigger sensor of the remote camera system that is configured to detect the target pest to trigger capture of an image; (v) a season of a year; (vi) environmental sensor data received from a sensor of the remote camera system arranged to sense local environmental conditions of the remote camera system; (vii) a time elapsed since a last service of the remote camera system; and (viii) a command received from the server.

The server may be further configured to: process the transmitted data using reference data to determine a second detection probability; compare the second detection probability to a second predetermined probability threshold; and verify the potential presence of the target pest on the pest detection surface based on the second detection probability being greater than the second predetermined probability threshold. The second predetermined probability threshold may be greater than the first predetermined probability threshold.

Alternatively, the server may be configured to process the transmitted data by transmitting the data to a computer device for display on a display of the computer device, and verify the potential presence of the target pest on the pest detection surface based on receiving a user verification signal from the computer device, said user verification signal indicating that a user of the computer device has verified the presence of the target pest on the pest detection surface.

The server may be further configured to provide the output in response to the verification.

The at least one remote camera system may be configured to detect more than one pest species.

According to another aspect of the present disclosure there is provided a server as defined above.

According to another aspect of the present disclosure there is provided a remote camera system as defined above.

According to another aspect of the present disclosure there is provided a method for detecting the presence of pests in a system comprising at least one remote camera system and a server, the method comprising:

the at least one remote camera system:
capturing one or more image of a pest detection surface of the at least one remote camera system using an image capture device of the at least one remote camera system;
processing the captured one or more image using a processor coupled to the image capture device to recognise the potential presence of a target pest on the pest detection surface; and
transmitting, via a wireless transmitter coupled to the processor, data from the captured one or more image in response to recognising the potential presence of one or more target pests; and the method further comprising:
the server:
receiving the transmitted data;
processing the transmitted data to verify the potential presence of the target pest on the pest detection surface; and
providing an output indicating the verification.

According to another aspect of the present disclosure there is provided a method for detecting the presence of pests using a remote camera system, the method comprising:
capturing one or more image of a pest detection surface of the at least one remote camera system using an image capture device of the at least one remote camera system;
processing the captured one or more image using a processor coupled to the image capture device to recognise the potential presence of a target pest on the pest detection surface; and
transmitting, via a wireless transmitter coupled to the processor, data from the captured one or more image in response to recognising the potential presence of one or more target pests to a server for verification of the potential presence of the target pest on the pest detection surface.

These and other aspects will be apparent from the embodiments described in the following. The scope of the present disclosure is not intended to be limited by this summary nor to implementations that necessarily solve any or all of the disadvantages noted.

BRIEF DESCRIPTION OF THE DRAWINGS

For a better understanding of the present disclosure and to show how embodiments may be put into effect, reference is made to the accompanying drawings in which.

DETAILED DESCRIPTION

The present disclosure provides a system hardware and communication architecture along with a software data processing system to permit the novel gathering, transmission, processing, storage, access, presentation and use of data generated by remote detection, monitoring and management systems. Although the present disclosure is described with respect to presently preferred embodiments relating to pest detection, monitoring and management applications, it is understood that the features of the present disclosure can be applied to any application requiring the remote detection, monitoring and management of a condition, and the remote gathering, processing, storage, access, presentation and use of data related to the monitored condition.

The present disclosure provides for a method, apparatus and system for collecting, communicating and analyzing information from one or more pest monitoring locations. The monitored locations include pest detection devices. These devices can include traps and/or passive and active monitoring devices that may or may not having a trapping or killing functionality. While traps may constitute the majority of activity sensing pest devices in a given pest control program, devices which only monitor pest activity may be preferred in some locations and applications. Accordingly, both types of devices may be utilized in the various environments in which the present invention may be employed. Further, unless the context provides otherwise, both traps and passive or active pest monitoring devices are included within the scope of the term "pest detectors" used herein.

The present disclosure provides such a method, apparatus and system that are practical, inexpensive and allow automatic monitoring of each detector, or of several detectors, concurrently from a remote location.

The method, apparatus and system enables the use of sensors with high data, power or processing requirements for continuous sensing. Such sensors include, but are not limited to, cameras and other imaging sensors.

The method, apparatus and system allows users to easily access data on relevant parameters of the detectors and the detected activity. This includes, but is not limited to, status of the detectors, measured pest activity, identity of the species detected and/or forecasts for future activity.

A division of sensor data processing between one or more remote devices and a server or other central computer contributes to the above noted advantages.

The present disclosure generally relates to pest control, and more particularly, but not exclusively, relates to techniques for sensing, communicating, storing, and evaluating data from pest control devices. More particularly, it relates to the use of image sensors in networked pest control systems and the associated data processing.

In this description the term "pest detector" refers to any trap, sensor, remote device or similar device or system which is placed where pests may encounter it and be detected or trapped. These devices can include traps and/or passive and active monitoring devices not having a trapping or killing functionality.

The pests detected in embodiments of the present discourse may include moths, termites, weevils, aphids, silverfish, thrips, beetles, ants, spiders, flies, fleas, mites and rodents. In particular, the pests detected in embodiments of the present discourse may include cockroaches, Carpet Beetles, Clothes Moths, European Corn Borer, Red Palm Weevil, Mill Moth, Red Mites, Pine Weevil, Red Fire Ant, Cotton Bollworm, Corn Earworm, Mosquitoes, Tobacco Budworm, Asian Longhorn beetle, Kharpa beetle, Diamondback moth, Spotted Wing Drosophila, wasps, and hornets.

Both a system hardware and communication architecture and a software data processing system are provided to permit gathering, transmission, processing, storage, access, presentation and use of the data gathered by the detection, monitoring and management system of the present disclosure.

Embodiments will now be described by way of example only.

Figure 1:
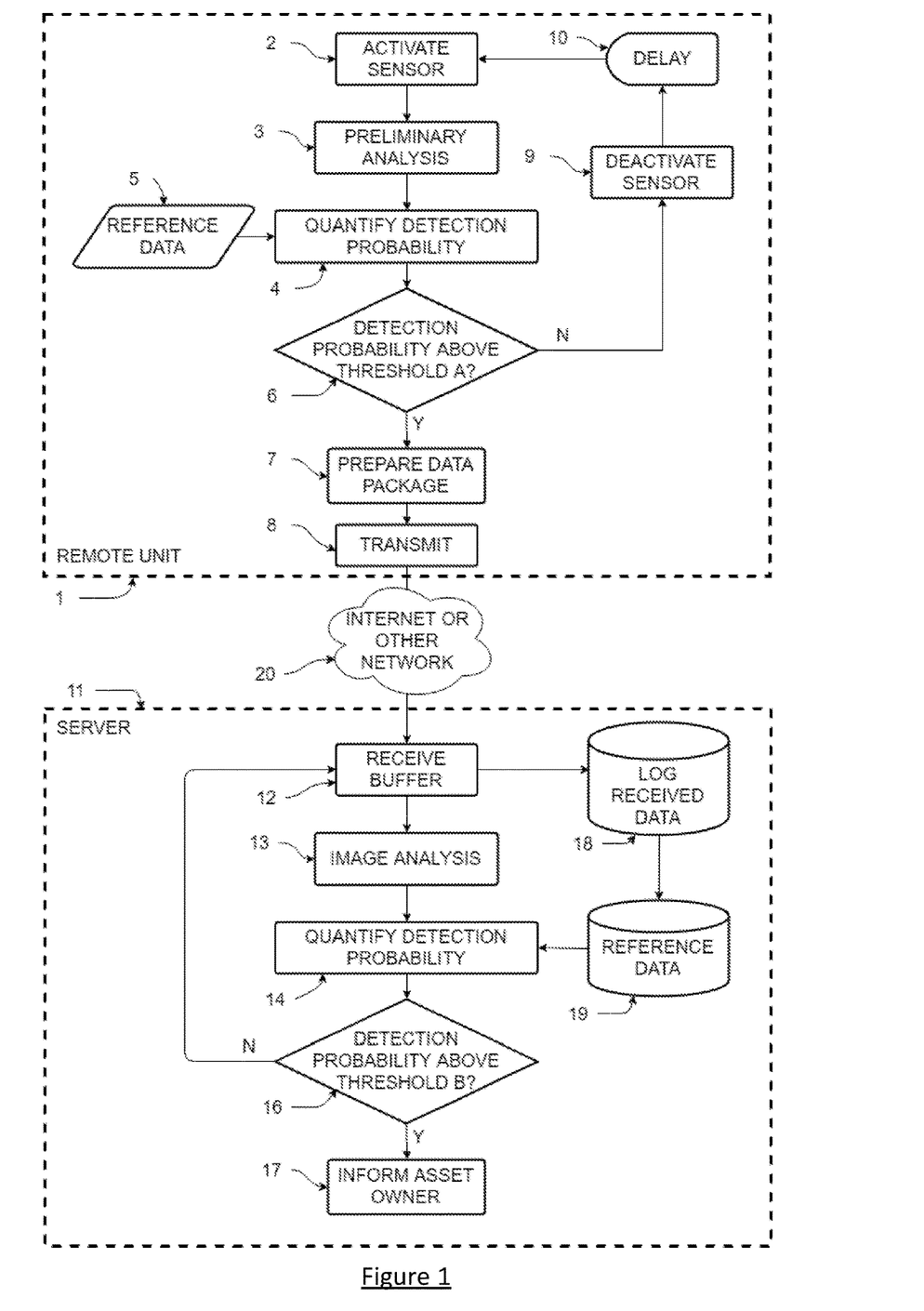
FIG. 1 is a flow diagram of one possible embodiment of the decision logic used by the system.

Referring to FIG. 1, an embodiment of a system that advantageously implements the present invention is shown. The system comprises remote units 1 (otherwise referred to herein as remote camera systems) and a central server 11. It will be understood that the remote unit shown in this figure may be one of many such remote units communicating with the server. The remote units will be located in positions of interest for the parameter being sensed. In the application of pest control this could be locations expected to be frequented by pests or where pests had previously been observed. In a preferred embodiment the server is connected to the internet and may be located anywhere in the world. Whilst a single server is shown, it will be appreciated that the functionality of the server 11 described herein may be implemented by more than one server for example in a distributed computing environment.

The remote units and the server communicate over a network 20. The nature of this network is not material to the present invention and may consist of a variety of different elements known in the art. These will be familiar to an expert in the field and in various embodiments may include but are not limited to: the internet; mesh network of remote devices using technology such as Zigbee; wireless communications such as WiFi, LoRaWAN, Bluetooth, cellular networks or Wireless HART; wired communications such as serial, USB or ethernet. The network may consist of combinations of the above or other methods. Whilst FIG. 1 illustrates direct communication between the remote unit 1 and server 11, it will be appreciated that the remote unit 1 may communicate with the server 11 indirectly via one or more intermediate devices or network entities.

In the preferred embodiment the remote unit consists of an imaging sensor 23 (otherwise referred to herein as an image capture device) and associated other hardware 21 to 27 best seen in FIG. 2 and is described in detail below. The imaging sensor is periodically activated 2 and the resulting image data is recorded for analysis 3 by the processor 24. This analysis may consist of one or more stages of processing of various parameters of the image. The image processing techniques used in this processing will be well known to experts in the field and include methods such as Haar cascades, kernel filtering, image descriptor methods and feature transforms. These processing techniques are to be selected to provide the most reliable indicators of detection for the lowest processing burden in the remote device. The result of the analysis is compared to reference data 5 to quantify the detection probability 4. The reference data 5 may include, for example, information on the size, colour or other characteristic parameters associated with the target pest and which can be used to assess whether the sensor data contains the target pest. The result of this quantification is not a definitive determination of the presence or not of the target pest or pests but rather a probability that the image contains the pest or pests. The probability is compared to a predefined level, 'threshold A' 6 and, if this is sufficient to justify the energy or financial cost of transmission, the data, including some or all of the original sensor data, is packaged for transmission 7. This data package is then transmitted 8 to the server 11 via the network 20.

The value for 'threshold A' is application specific, for detection of bedbugs where the number of triggers will probably be low and the consequences of missing a detection are high a low threshold for transmission would be used, for example 25%. For other applications where communication is more difficult and where missing occasional detections doesn't matter because there will be a high number of detections and an overall impression of how many insects there are (e.g. aphids in wheat fields) is sufficient for the asset owner, a much higher threshold may be used, for example 75%.

That is, there is a yes/no decision on whether to transmit or not from the remote unit 1 to the server. This decision could be made in a number of ways, such as calculating a total confidence level from a weighted sum or by voting between different methods where the decision is made to transmit, if more than 2 out of 3 different calculations give a positive result.

If the detection probability was insufficient for the determination 6 the sensor is deactivated, returning the remote unit to a low power mode, for a period of time 10 before the sensor is reactivated.

The transmitted data package is received in a buffer 12 by the server 11. The message is logged and the data stored in a database 18. The server 11 performs additional data analysis on the received data. The server 11 has far lower restrictions on processing capability, data storage and power consumption than the remote device. As a result, the server 11 is able to perform much more detailed analysis 13 and compare this to a greater quantity of reference data 19 to determine the detection probability. This allows a much greater level of confidence in the quantification of detection probability 14 than is possible in 6 on the remote device. If the detection probability is above a second threshold B 16 the server may automatically send a message to the asset owner 17 with a summary of the detection and the detection probability. The value for the second threshold B is application specific, the second threshold B may be higher than the first threshold, threshold A.

If the detection probability is below the threshold B the routine will await the next message to process. If the detection probability is above the threshold B the server 11 verifies the potential presence of the target pest. Thus it can be seen that the server 11 processes the data received from the remote unit 1 to increase confidence in the determination performed by the remote unit 1 as to whether a pest is or is not present in the image and thereby reduces uncertainty over whether a pest is present. Note that the threshold B may be set at a level that indicates that when the detection probability is above the threshold B the server has gained sufficient confidence in the pest being present (rather than being 100% certain that a pest is present).

The second decision on whether or not to inform the asset owner 17 is application specific and may not always occur. In some applications, where even a single detection is significant to the asset owner, it is appropriate to inform the asset owner 17 in the case of any detection. In this case any detection gets immediately sent to the user and there is a clear decision for the system to make. However, in applications such as agriculture, where the asset owner is likely interested in a daily or weekly summary of overall activity detected, there may not be a decision to send specific messages. In these cases, when the system may detect many insects each day the server 11 may simply calculate and store the total number of detections for later reference.

In this embodiment the database of received messages 18 may be used to improve the reference data 19. In a preferred embodiment this may be by machine learning techniques known in the art.

In other embodiments the system may include the ability for the server to change the reference data on the remote units to improve the reliability of the initial detection probability calculation. It may also allow changing of other system parameters of the remote unit with the effect of improving its performance by increasing the reliability of detection probabilities, reducing the power consumption or reducing the amount of data transmitted via the network. Such parameters may include, but are not limited to, the delay 10, the times of day the device is active, the compression or approximation of the data transmitted.

In other embodiments the server may have the capability of sending messages to remote units to request a sensor activation and transmission from the remote unit or the transmission of the remote unit's status data. Such status data could include parameters such as battery status or the number of candidate detections analysed. The remote unit 1 may transmit the remote unit's status data to the server 11 automatically without a call from the server 11. This may be done periodically e.g. the remote unit 1 transmitting the remote unit's status data to the server 11 each day.

The 'threshold A' may be fixed. Alternatively the 'threshold A' may be varied dynamically and is controlled by the processor 24. Varying the 'threshold A' dynamically advantageously avoids wasting resources (e.g. battery energy, processor resources on the remote unit and/or network resources) transmitting detections where factors other than the result of the image analysis reduce the probability below an acceptable level. Expressed another way, the chance of the system correctly alerting the asset owner to the presence of a pest is increased if data known to the remote unit, but that is not contained within the sensor data (e.g. time of day), makes it more likely that a given detection is true.

The 'threshold A' may be varied dynamically based on factors known to the system, which may include one, or a combination of the following factors:

i) a battery level of the battery 28 in the remote unit 1—if the battery level of the battery 28 is low then it may be advantageous to conserve the remaining energy and use it only on the highest probability detections, rather than squandering it on low probability detections. As a result, the processor 24 may increase the 'threshold A' as the battery runs down. The processor 24 may determine the battery level of the battery 28 in the remote unit 1 and change the 'threshold A' according to the value of the battery level.

ii) recent triggering events—the 'threshold A' may be set to an initial value. During processing of a first captured image, if the processor 24 determines that the detection probability is greater than the initial value for the 'threshold A' then the processor may increase the 'threshold A' to the detection probability determined from the first captured image. This process can be repeated when processing subsequently captured images. Thus the remote unit 1 only transmits if the data is higher confidence (i.e. indicating a higher quality image) than recent previous detection events so the remote unit 1 does not waste power sending repeats that add no additional value to the asset owner. Alternatively, if a pest is known to be either social or solitary then the probability of a given detection being true can be expected to be correlated (positively or negatively, respectively) with the number detected in a given time. This can be used to improve overall system sensitivity and specificity by setting a higher or lower threshold.

iii) a time of day—the remote unit 1 may further comprise a clock indicating the time of day. If the target pest is active at certain times of the day then the 'threshold A' may be varied in dependence on the time of day. The processor 24 may determine the time of day by querying the clock and set the 'threshold A' to a value assigned to the time of day. For example, mosquitoes are most active at dawn and dusk so a detection at those times is more likely to be true, so a lower threshold can be used.

iv) sensor data received from a trigger sensor—in embodiments, the remote unit may comprise a secondary sensor (also referred to herein as a trigger sensor) which is used to activate the main imaging sensor 23. If the nature of this trigger sensor is that it provides an output other than a binary result, and the value of the output is known to correlate with a given pest, then the output of the trigger sensor may also be used to adjust the 'threshold A' to improve the overall sensitivity or specificity. For example, if the trigger sensor is a weight sensor and if the weight measured is very different to the expected weight of the pest then the 'threshold A' could be set at a higher level because greater confidence is needed in the image result to counteract the likelihood that it is not the pest because the weight is wrong.

v) a season of a year—If the target pest is active during certain seasons of a year then the threshold may be varied in dependence on the season. The processor 24 may determine the season (e.g. by querying the clock) and set the 'threshold A' to a value assigned to the season of the year.

vi) local environmental conditions—the remote unit 1 may comprise one or more sensors arranged to sense local environmental conditions and output environmental sensor data (e.g. temperature and/or light level). For example, the target pest may be most active at high temperatures so a detection at those times is more likely to be true, so a lower threshold can be used. The processor 24 may determine the local environmental conditions based on the received environmental sensor data and set the 'threshold A' to a value assigned to the environmental sensor data.

vii) time since last service—dust accumulation on the optics 22 or degradation of the illumination source 29 may reduce the sensitivity, so a lower threshold may be used to compensate for this. That is, processor 24 may determine the time elapsed since a last service of the remote unit 1 by a user and control the 'threshold A' in dependence on this elapsed time.

viii) a command received from the server 11—The server 11 may send a command to the remote unit 1 with a revised value for 'threshold A' or an instruction to increase/decrease the 'threshold A'. For example, if the remote unit 1 has been sending lots of poor quality results (whereby the server 11 determines that in fact no pest is present) the server may instruct the processor 24 to increase the 'threshold A' to save power.

Whilst FIG. 1 illustrates the server 11 performing the additional data analysis on the image data received from the remote unit 1 (at blocks 13, 14, 16), in alternative embodiments the server 11 is configured to process the image data by transmitting it to a computer device for display on a display of the computer device. A human then views the image data that is displayed on the display of the computer device, and provides an input recording whether there is, or is not, a target pest on the pest detection surface. The server 11 verifies the potential presence of the target pest on the pest detection surface based on receiving a user verification signal from the computer device, the user verification signal indicating that a human has verified the presence of the target pest on the pest detection surface. Upon reception of the user verification signal the server 11 can inform the asset owner 17.

Figure 2:
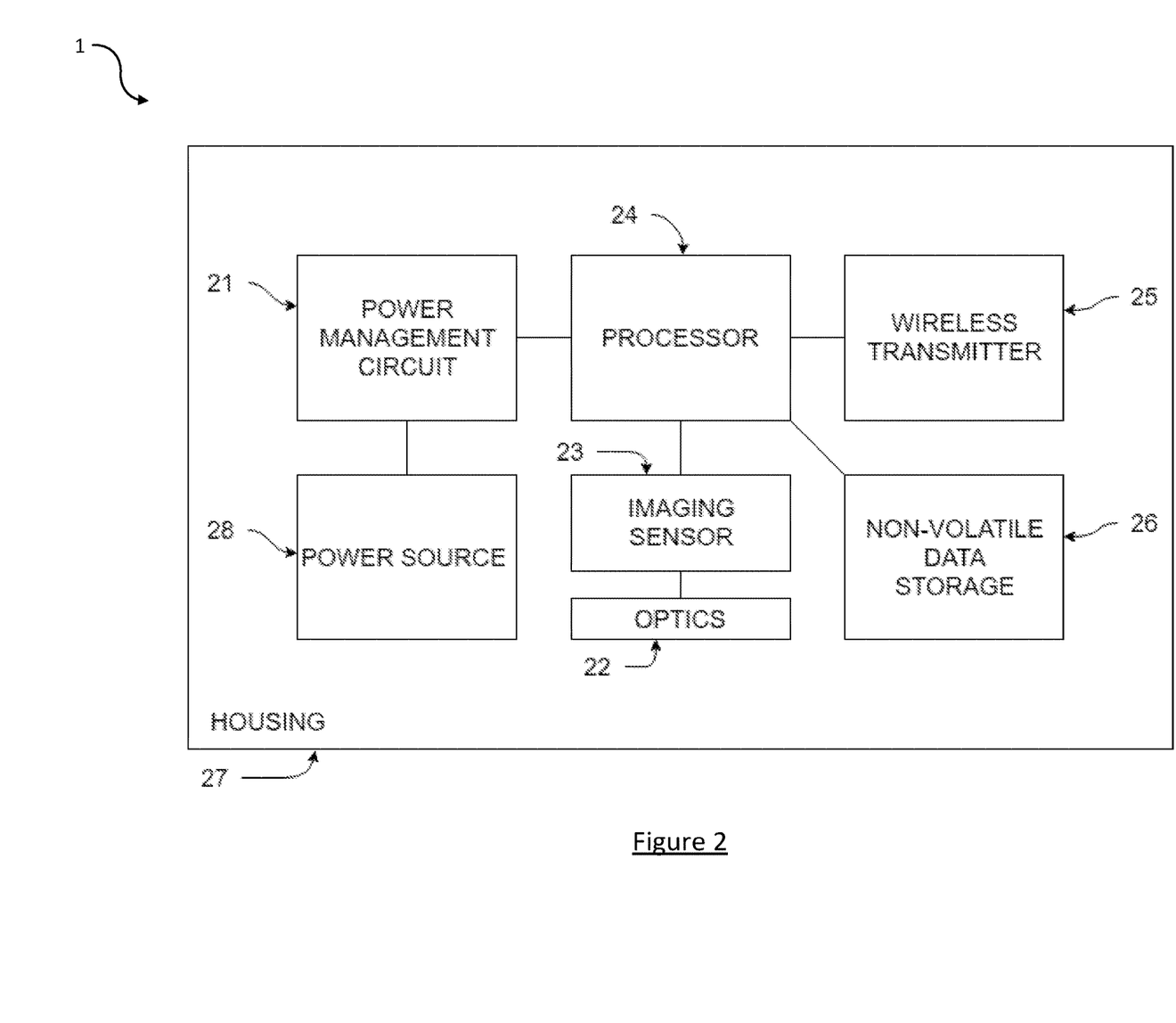
FIG. 2 is a block diagram illustrating a preferred embodiment of the main components of the remote unit.

Referring to FIG. 2, a block diagram of a preferred embodiment for the remote unit 1, an imaging sensor 23 has an interface to a processor 24. In an embodiment the imaging sensor takes the form of a miniature CMOS or CCD sensor, selected for suitable frame rate, resolution and power consumption for the particular sensing application. However it will be understood that the present invention is not specific to optical imaging sensors and, depending on the needs of the application, the sensor may be any sensor with power and processing requirements that would limit the viability of the product for cost or power reasons. Such sensors include, but are not limited to, spectroscopic sensors, electromagnetic sensors, interferometers, ultrasonic sensors and magnetic resonance sensors, and/or audio sensors.

In the embodiment illustrated in FIG. 2 the imaging sensor 23 is operatively connected to an optical system 22. This may comprise any arrangement of lenses, mirrors, filters and other optical elements that presents the target area to the camera advantageously for the image processing system.

The processor 24 manages the system and, in this embodiment, performs the logic shown in FIG. 1. In addition, the processor monitors the time to determine when to activate and deactivate the sensor. The non-volatile data storage 26, which may be contained within the processor component in some embodiments, is used to store the reference data 5. The wireless transmitter 25, which may be a standard component, selected to use any of the common communications protocols or may be specifically designed for a particular application, is used for transmission of data 8 and may also be used for receiving instructions or additional data from the server.

The remote unit contains a power source 28, which in some embodiments consists of a battery. In other embodiments it may consist of solar cells, supercapacitors or energy harvesting systems as will be familiar to an expert in the field of low power sensor systems. The power source will be managed by a power management circuit 21. In one embodiment this circuit consists of a buck-boost switch mode DC to DC converter, of the type common in the art. In an embodiment, the functionality of this power management circuit is controlled by the processor to further improve the overall power consumption of the system.

The entire system is enclosed in a housing 27, where the imaging sensor and optics may be arranged to observe any combination of internal or external locations or features. In one embodiment (referred to in more detail with reference to FIG. 4 below) for pest control the imaging sensor may be mounted externally and the remote unit mounted in such a way that the image produced is of a path frequented by pests or in any combination. An example of such an arrangement would be to mount the unit on a wall, pointing down at a path or route frequented by the pest.

As discussed above, the remote unit may comprise a secondary sensor (also referred to herein as a trigger sensor) which is used to activate the main imaging sensor 23. This is advantageous if the secondary sensor can operate at lower power consumption. An example of such an arrangement would be the use of simple light gates or curtains to detect when a possible object is in the detection area of the main sensor. In this case the secondary sensor may replace or function in addition to the delay 10.

The processor 24 may implement low power analysis of image data (e.g. every $10^{th}$ pixel) to detect possible pest presence and determine whether to analyse the image more. In this technique, when the delay expires or the secondary sensor is triggered the processor 24 would only read certain pixels (e.g. 1st, 11th, 21st etc.) in each row and column from the camera. This would essentially provide a low resolution version of the whole image. The analysis of this low resolution version by the processor 24 would then identify where in the image the target object is. The processor 24 would then read out the full resolution image data of the region around the target location and analyse this in more detail. This high resolution data could possibly be from a new image or possibly from the original image, depending on the camera chosen.

In one example implementation, the secondary sensor may give an indication of where on the pest detection surface the target pest is, and the processor 24 could then only collect and process image data for a portion of the image around this location, reducing the processing requirement of the processor 24 and thus power consumption of the remote unit 1.

In embodiments the processor 24 may use low power modes for its own function and for the wireless transmitter 25, the power management circuit 21 and the non-volatile data storage 26 to reduce the overall power consumption of the remote unit. It may also use other data to adapt the time spent in these low power modes, as well as the delay 10. This data may include, but is not limited to, the calculated probability of the previous detection, the time of day and the number of detections made over a recent period of time.

In embodiments for pest control the remote unit may also make use of an attractant to lure the target into range of the sensor. Examples of attractants include, but are not limited to, a patterned surface, an ultraviolet reflector, a physical structure, a heat source, a natural pheromone produced by the species of the target pest, and food for the target pest. The term "patterned surface" is used herein to mean a surface texture, material or colour that are attractive to the target pest.

For example, certain insects are attracted to fur or wood textures, usually corresponding to what they like to eat. Other insects are attracted to particular shapes that mimic the shapes found in their harborages or nests, such as honeycomb shapes or corrugations. Finally, many flying insects are attracted to surfaces that mimic the appearance and textures of flowers whereby the colour (including in non-visible IR and UV spectra) attracts the insects.

In further embodiments the remote unit may include a mechanism to periodically or continuously dispense or expose new attractant if it is consumed or depleted over time.

It will be understood that a large number of other possible embodiments are possible under the present invention and that each will be suited to different sensing tasks.

Figure 3A:
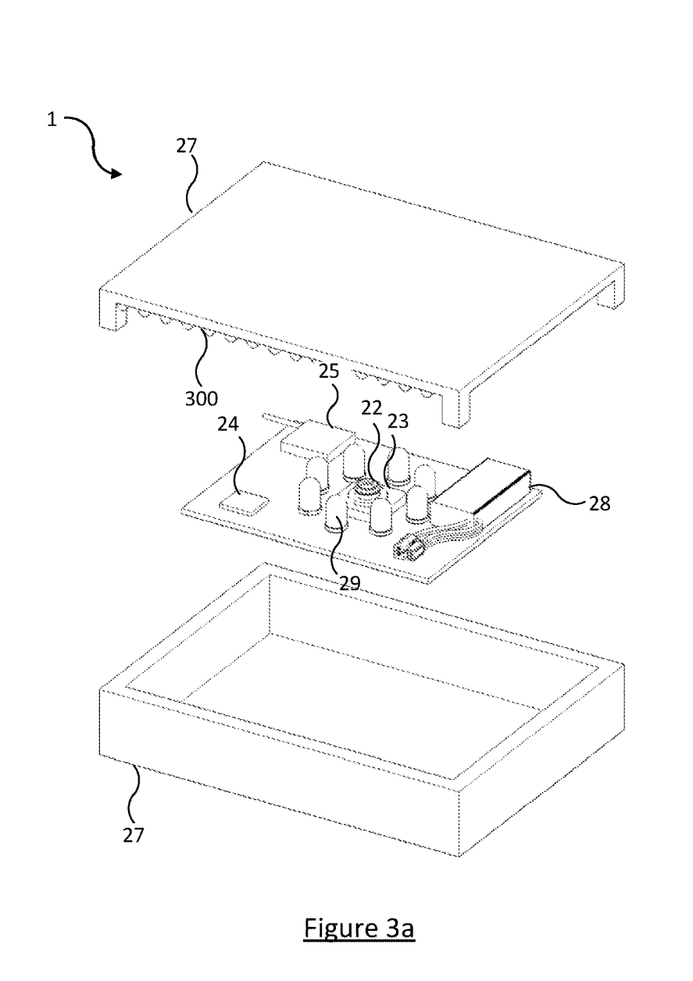
FIGS. 3a and 3b illustrate one possible embodiment of the remote unit.
Figure 3B:
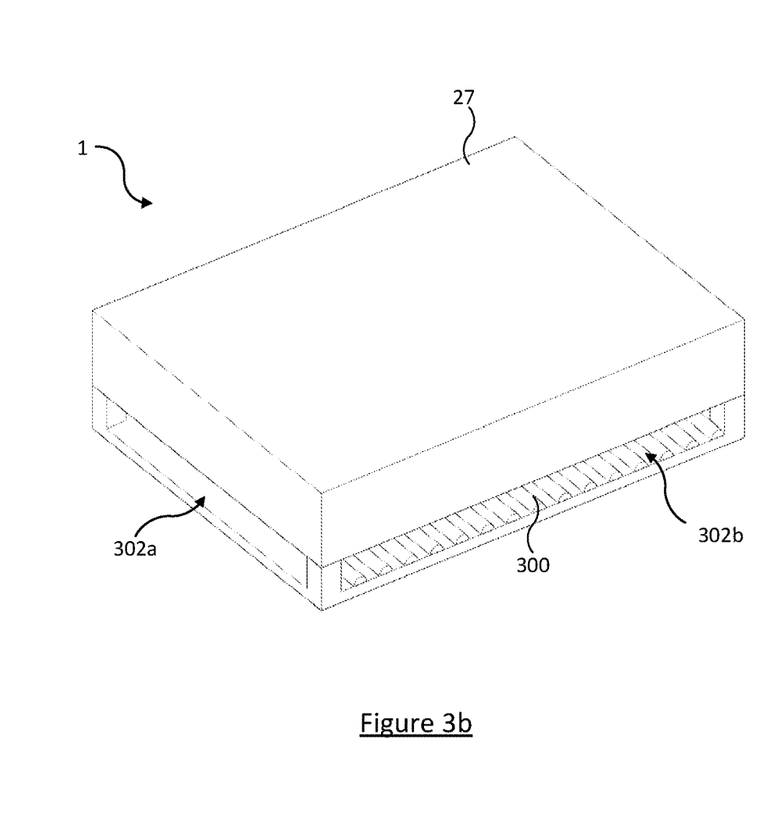

FIGS. 3a and 3b are perspective drawings of one possible embodiment of the remote unit 1. In this embodiment for pest control the imaging sensor and optics are configured to capture images substantially of a pest detection surface 300 within the housing. That is, the pest detection surface comprises part of or is attached to the housing 27 of the remote unit 1. In such an embodiment the housing 27 would be designed to allow pests to access an interior space via one or more opening 302a,b and there may be an attractant or bait within the housing 27 to encourage them to move into the space to be detected.

Figure 4:
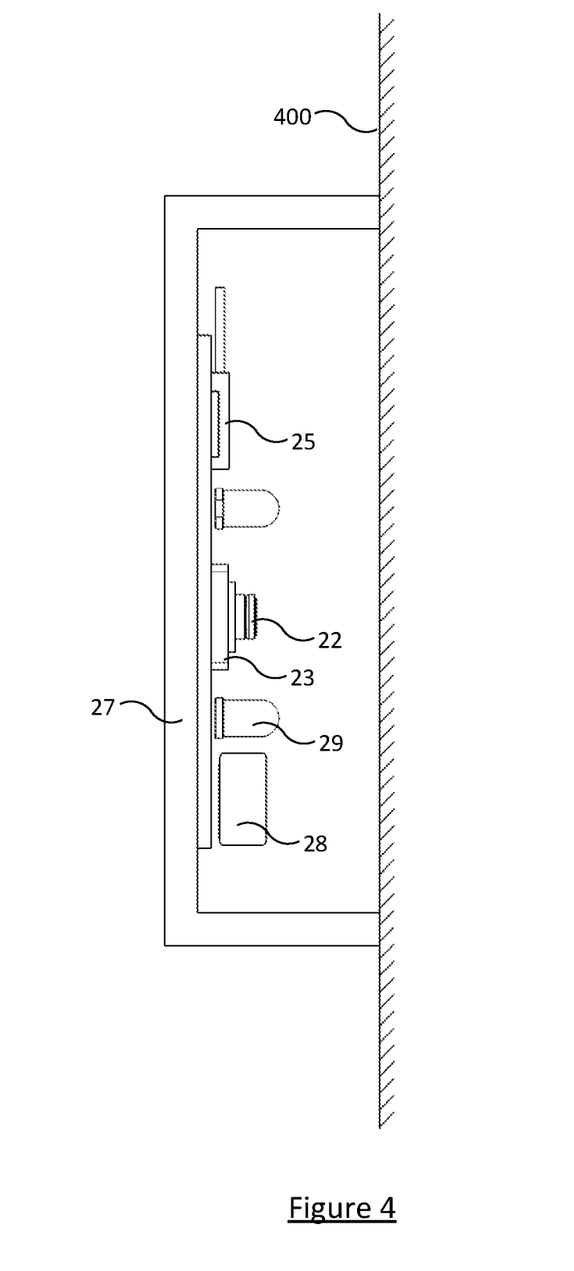
FIG. 4 illustrates another possible embodiment of the remote unit.

FIG. 4 shows a perspective drawing of another possible embodiment of the remote unit.

FIG. 4 shows an embodiment similar to that shown in FIG. 3, with the significant difference that, in this embodiment, the pest detection surface 400 is not part of, nor attached to, the housing 27 of the remote unit 1. The remote unit 1 is constructed so that the position of the camera is controlled with respect to the detection surface 400. In this embodiment this is achieved through the use of posts or legs to position the camera at a set distance from the pest detection surface 400. Depending on the target application the pest detection surface 400 may be, but is not limited to, the ground, a wall, flooring, skirting board or other indoor element (e.g. a bedframe, mattress, headboard, bedsheets or other soft furnishing); a treetrunk or other part of a plant; sticky flypaper or other commercial pest trap.

As shown in FIGS. 3a, 3b and 4 one or more light sources 29 (for example LEDs) may be used to provide illumination to the pest detection surface.

Figure 5:
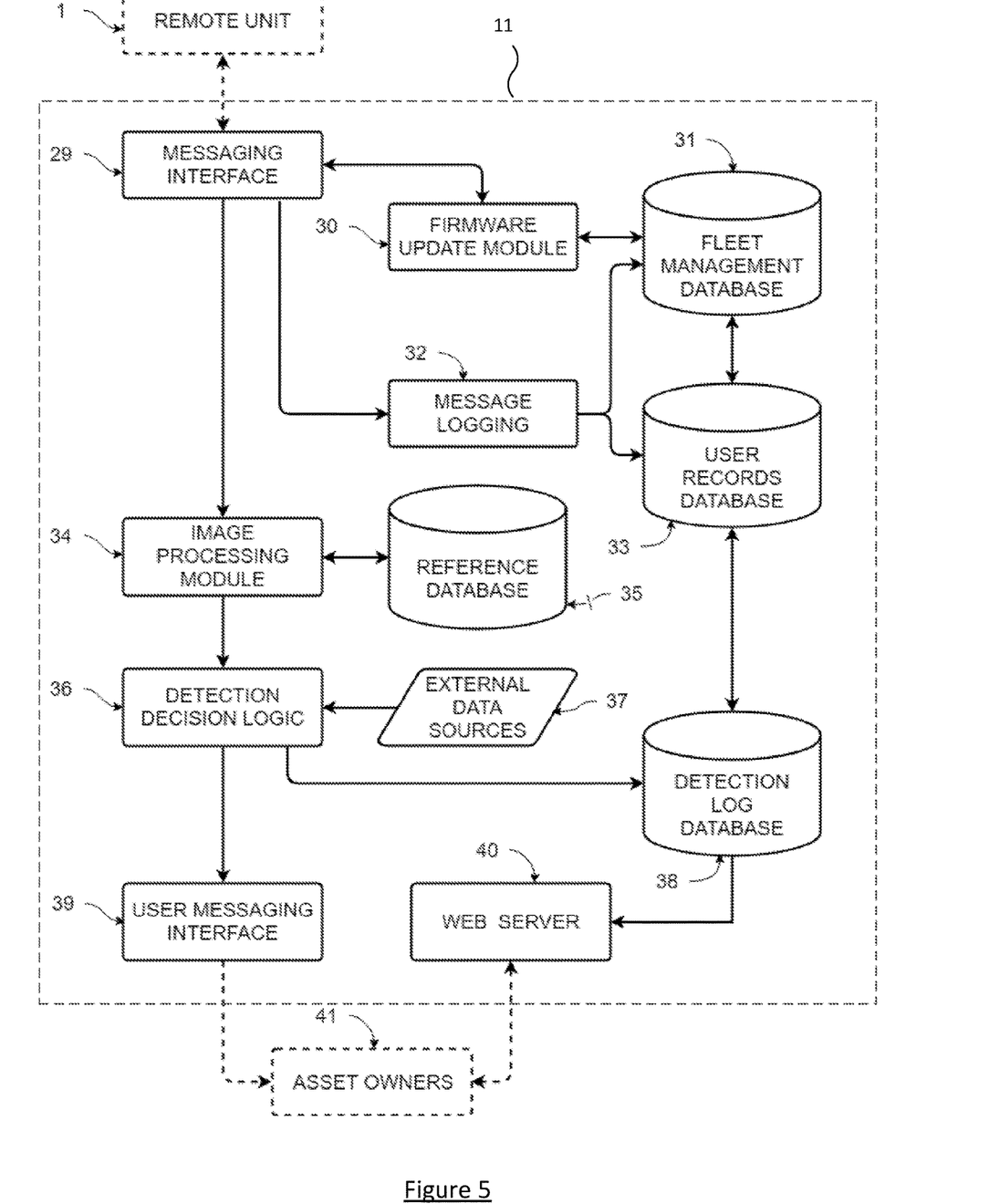
FIG. 5 is a block diagram illustrating an embodiment of the main components of cloud server.

Referring to FIG. 5, a block diagram illustrating an embodiment of the main components of cloud server 11, messages received from the remote unit 1 are processed by a messaging interface 29. This messaging interface interfaces to the communications protocol and provides send and receive buffers 12 for messages received from remote units or to be transmitted to them. In one embodiment the messaging interface would communicate with an email server, which the remote units would send messages to. The interface would download the messages to the server, identify the type of message to determine if the message requires sensor data processing and extract the data into a suitable format for the processing. The messaging interface passes the content of the message to a message logging module 32, which stores it (as per 18) in a user records database 33 and associates the message with the corresponding entries in the fleet management database 31.

In this embodiment, which describes a system where the sensor is an imaging sensor, the messaging interface 29 also passes the sensor data content of any messages to a data processing module shown as image processing module 34. The data processing is performed by the image processing module 34 with reference to a pre-existing reference database 35, containing reference data. The reference data may include training data, thresholds, size, colour or other characteristic parameters associated with the detection target and which can be used to assess whether the sensor data contains the detection target. The image processing module 34 performs a more detailed or rigorous analysis 13 than that conducted on the remote unit 4. The additional detail or rigor at this stage arises from either a greater quantity of reference data, a greater level of processing, for example by conducting a larger number of filter stages in a Haar cascade, or a combination of both.

The image processing module 34 may comprise a trained neural network. In these embodiments, the reference data may include weighting factors in the trained neural network. That is, the server 11 may process the image without referring to image data (stored in the reference database) directly but on some pre-processed comparison metrics.

The result of the data processing is passed from the image processing module 34 to a detection decision logic module 36. This module analyses the result of the data processing to determine whether the detection probability is sufficient to inform the asset owner 17. In the preferred embodiment this logic is influenced by external environment information provided by external data sources 37. The external environment information includes, but is not limited to, the time of day, the weather, a time of year, temperature information, humidity information, insect population data, user input data specifying when an environment of the least one remote camera system was treated with a pest treatment, the activity of other nearby remote units and other factors that are not known to the remote units but which affect the probability that the detection is a true positive.

The outcome of the detection decision logic is stored in a detection log database 38. The entries in this database are referenced to the user records database so that the relationship between individual detection events, particular remote units and a particular asset owner are all maintained.

Access to the contents of the detection log database 38, the user records database 33 and the fleet management database 31 is provided to asset owners through a web server 40. This provides a website that asset owners 41 can use to manage the remote units relevant to their assets, to see a summary of all detection events.

In one embodiment a user messaging interface 39 is provided in addition to the web server 40. This user messaging interface will transmit an alert to the asset owner 41 if a positive detection is determined by the detection decision logic 36.

The server 11 maintains a fleet management database 31, which includes records for remote units associated with the server 11. Such records may include serial numbers, software versions and locations of the remote units. The database is associated with the user records database 33 and the detection log database 38.

In the preferred embodiment the server 11 provides the capability of reprogramming the remote units or updating their reference data by means of a firmware update module 30.

In the preferred embodiment the web server 40 is secured using industry standard security measures, such as SSL, HTTPS, username and password combinations or two factor authentication to prevent any other parties from accessing the data relating to a particular asset unless they are the asset owner or their authorised representative.

In another embodiment the web server 40 is functionally linked to the reference database, which may contain data about the relationship between the detection frequency and the true population of a pest. Such data may be calculated from controlled experiments or by correlating the data from the present invention with a secondary detection system, such as the manual systems known in the art. The web server would use this data to estimate the true population from the data in the detection log database 38.

In another embodiment the web server 40 may use the records in the detection log database to make forecasts of future detection activity. For example, in the case that the present invention is used for the management of agricultural pests such as aphids, the web server may make a forward prediction of the population.

For various embodiments the web server 40 will provide a range of presentations of the detection data to allow the asset owner to more easily determine the correct course of action. In one such embodiment the web interface provides a graph of detection events as a function of time. Additionally, or alternatively, the web interface provides a summary of all the remote units associated with a particular asset, with details of age, battery status, remaining life to replacement, time of most recent communication with the remote unit and number of detections made by each remote unit. Additionally, or alternatively, the web interface presents the locations of the remote units on a diagram or map representing one or more of the asset owner's assets. The detection data may be represented on said diagram or map by means of a heatmap, topological map, 3D surface or other graphical representation of detection activity. Additionally, or alternatively, the web interface provides a summary of the financial benefit to the user from using the system.

In another embodiment for pest control the web server 40 provides an integrated method to send detection events or summaries of detection events to a third party. For example, a button may be provided to send the data to the asset owner's preferred pest control company, along with instructions for them to visit the asset and resolve any infestation.

Whilst server 11 is shown as a dedicated server for detecting the presence of pests, the functionality of server 11 may be integrated into an asset owner's existing systems (e.g. one or more server) which perform additional functions other than pest detection.

Although the disclosure has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the disclosure, whether alone or in any appropriate combination with any other feature disclosed or illustrated herein.

We refer herein to a system where processing is split between remote device comprising a sensor, and server. The sensor may be an imaging system/camera. The device may be a pest detector. The device may use a low power sensor (e.g. light gate) to activate the sensor ("gating"). The system may use low power modes to reduce power consumption. The system adapts its sensing parameters according to the power available. The system may adapt its sensing parameters according to external factors. The system may allow data to be sent from the server to the remote device. The system may adapt the sensing parameters of one or more remote devices according to changes in the activity of other remote devices. The server may send messages to a user. The system may use an attractant to reduce power consumption. The system includes a mechanism to refresh or renew an attractant. The system may detect a sample of the pest population and uses this to estimate the total population. The target pest may enter the device itself or may enter an area of a surface at least partially enclosed by the device. The target pest may be killed by the device. The system may provide the ability to automatically pass on data to a 3rd party, in addition to the asset owner (e.g. a PCC or Agronomist). The server may provide a web interface for a user, this user interface may be secured. The system may provide a summary of remote device status. The system may provide a summary of a replacement schedule of the remote devices. The system may provide forecasts of future activity, this forecast may be made by drawing in external data e.g. weather forecasts. The system may calculate and shows an estimate of the financial benefit of the system to the user/asset owner. The system may show the physical location of the remote units on a diagram or map. The system may show data on the detected activity.

The invention claimed is:

1. A system for detecting the presence of pests, the system comprising:
at least one remote camera system, each of the at least one remote camera system comprising an image capture device coupled to a processor and a wireless transmitter, each of the at least one remote camera system having a pest detection surface and being configured to:
capture one or more images of the pest detection surface,
process the one or more captured images using reference data to determine a first detection probability,
compare the first detection probability to a first predetermined probability threshold,
recognise the potential presence of the target pest on the pest detection surface based on the first detection probability being greater than the first predetermined probability threshold, and
transmit data from the one or more captured images in response to recognising the potential presence of the target pest; and
a server configured to:
receive the transmitted data,
process the transmitted data using reference data to determine a second detection probability,
compare the second detection probability to a second predetermined probability threshold, the second predetermined probability threshold greater than the first predetermined probability threshold,
verify the potential presence of the target pest on the pest detection surface based on the second detection probability being greater than the second predetermined probability threshold, and
provide an output indicating the verification.

2. The system of claim 1, wherein the at least one remote camera system is further configured to process the data from the one or more captured images to reduce a quantity of data to be transmitted by selecting a data segment from the one or more captured images restricted in one or both of time and space.

3. The system of claim 1, wherein the image capture device is configured to be mounted in a fixed spatial relationship with the pest detection surface.

4. The system of claim 1, wherein the pest detection surface comprises part of or is attached to a housing of the at least one remote camera system.

5. The system of claim 1, wherein the pest detection surface is no more than 30 centimeters from the image capture device.

6. The system of claim 1, wherein the at least one remote camera system further comprises a sensor to detect the target pest to trigger capture of an image.

7. The system of claim 1, wherein the at least one remote camera system further comprises a pest attractant.

8. The system of claim 7, wherein the pest attractant comprises a pheromone or a kairomone.

9. The system of claim 7, wherein the pest attractant comprises one or any combination of: a patterned surface, an ultraviolet reflector, a physical structure, a heat source, and food for the target pest.

10. The system of claim 1, wherein one or both of the server the at least one remote camera system is configured to input external environment information and wherein one or both of the image capture and image processing by the at least one camera system are responsive to the external environment information.

11. The system of claim 10, wherein the external environment information comprises a time of day, weather information, a time of year, temperature information, humidity information, insect population data, user input data specifying when an environment of the least one remote camera system was treated with a pest treatment, or any combination thereof.

12. The system of claim 1, wherein one or both of the server and the at least one remote camera system is configured to adapt the at least one remote camera system in response to the transmitted data.

13. The system of claim 1, wherein the server is further configured to provide the output in response to the verification.

14. The system of claim 1, wherein the at least one remote camera system is configured to detect more than one pest species.

15. A method for detecting the presence of pests in a system comprising at least one remote camera system and a server, the method comprising:
the at least one remote camera system performing operations that comprise:
capturing one or more images of a pest detection surface of the at least one remote camera system using an image capture device of the at least one remote camera system,
processing, by operation of a processor coupled to the image capture device, the one or more captured images using reference data to determine a first detection probability,
comparing the first detection probability to a first predetermined probability threshold,
recognising the potential presence of a target pest on the pest detection surface based on the first detection probability being greater than the first predetermined probability threshold, and
transmitting, via a wireless transmitter coupled to the processor, data from the one or more captured images in response to recognising the potential presence of the target pest; and
the server performing operations that comprise:
receiving the transmitted data,
processing the transmitted data using reference data to determine a second detection probability,
comparing the second detection probability to a second predetermined probability threshold, the second predetermined probability threshold greater than the first predetermined probability threshold,
verifying the potential presence of the target pest on the pest detection surface based on the second detection probability being greater than the second predetermined probability threshold, and
providing an output indicating the verification.

16. The system of claim 7, wherein the target pest comprises one or any combination of a fruit fly, a bed bug, a silverfish, a cockroach, an insect, and an athropod.

* * * * *